US009008010B2

(12) United States Patent
Frenger et al.

(10) Patent No.: US 9,008,010 B2
(45) Date of Patent: Apr. 14, 2015

(54) UPLINK COORDINATED INTER-CELL INTERFERENCE CANCELLATION

(75) Inventors: Pål Frenger, Linköping (SE); Eva Englund, Linköping (SE); Fredrik Gunnarsson, Linköping (SE); Niclas Wiberg, Linköping (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 822 days.

(21) Appl. No.: 12/992,039

(22) PCT Filed: May 21, 2008

(86) PCT No.: PCT/SE2008/050592
§ 371 (c)(1),
(2), (4) Date: Jun. 30, 2011

(87) PCT Pub. No.: WO2009/142559
PCT Pub. Date: Nov. 26, 2009

(65) Prior Publication Data
US 2012/0093093 A1    Apr. 19, 2012

(51) Int. Cl.
*H04W 4/00* (2009.01)
*H04B 7/04* (2006.01)
(Continued)

(52) U.S. Cl.
CPC ............ *H04B 7/0452* (2013.01); *H04J 11/005* (2013.01); *H04L 5/0023* (2013.01); *H04L 5/0032* (2013.01); *H04L 5/0073* (2013.01); *H04W 92/045* (2013.01); *H04W 92/20* (2013.01)

(58) Field of Classification Search
USPC ................. 370/328, 329, 332, 338, 341, 342; 455/63.1, 296
See application file for complete search history.

(56) References Cited

U.S. PATENT DOCUMENTS 5,444,766 A * 8/1995 Farwell et al. ................ 455/437
7,899,014 B2 * 3/2011 Li et al. ......................... 370/332
(Continued)

FOREIGN PATENT DOCUMENTS

EP      1775978 A1    4/2007
WO   2008120159 A2   10/2008

OTHER PUBLICATIONS

International Search Report mailed on Mar. 10, 2009 for corresponding International Application No. PCT/SE2008/050592.
(Continued)

*Primary Examiner* — Kan Yuen
(74) *Attorney, Agent, or Firm* — Patent Portfolio Builders PLLC

(57) ABSTRACT

Device, computer readable medium and method for joint multi-user processing in a first base station of a telecommunication network, which includes at least a second base station and first and second terminals served by the corresponding first and second base stations. The method includes issuing, at the first base station, a first uplink transmission grant for the first terminal; receiving, at the first base station, from the second base station scheduling information about an uplink transmission of the second terminal, wherein an uplink transmission grant for the uplink transmission of the second terminal is issued by the second base station; and jointly decoding, at the first base station, an uplink transmission from the first terminal and the uplink transmission from the second terminal, which is not served by the first base station, based on the received scheduling information about the uplink transmission of the second terminal.

24 Claims, 10 Drawing Sheets

(51) Int. Cl.
*H04J 11/00* (2006.01)
*H04L 5/00* (2006.01)
*H04W 92/04* (2009.01)
*H04W 92/20* (2009.01)

(56) References Cited

U.S. PATENT DOCUMENTS

| | | | |
|---|---|---|---|
| 8,244,254 B2* | 8/2012 | Kashiwase | 455/438 |
| 2006/0094372 A1* | 5/2006 | Ahn et al. | 455/67.13 |
| 2007/0060167 A1* | 3/2007 | Damnjanovic et al. | 455/450 |
| 2008/0107197 A1 | 5/2008 | Jen | |
| 2011/0211618 A1* | 9/2011 | Oyman et al. | 375/211 |

OTHER PUBLICATIONS

Written Opinion of the International Searching authority mailed on Mar. 10, 2009 for corresponding International Application No. PCT/SE2008/050592.

3GPP TSG RAN-1 Meeting #37; "OFDM with interference control for improved HSDPA coverage"; Alcatel; 6.2, OFDM (Inter-cell interference and related frequency re-use aspects); pp. 1-11; May 10-14, 2004; Montreal, Canada.

3GPP TSG RAN-1 Meeting #52, R1-080774; "UL MU-MIMO Scheduling for High Mobility"; 6.3.7 Nortel; pp. 1-3; Feb. 11-15, 2008; Sorrento, Italy.

3GPP TSG RAN WG1 Meeting #52, R1-080909; "Requirements for E-DCH TDM support"; 8 Ericsson; pp. 1-2; Feb. 11-15, 2008; Sorrento, Italy.

3GPP TS 36.300, V8.2.0 Technical Specification; "3rd Generation Partnership Project; Technical Specification Group Radio Access Network; Evolved Universal Terrestrial Radio Access (E-UTRA) and Evolved Universal Terrestrial Radio Access Network (E-UTRAN; Overall description; Stage 2 (Release 8)"; pp. 1-109; Sep. 2007.

Robert Heath, Jr. et al.; Coordinated Training and Transmission for Improved Interference Cancellation in a Cellular Network; Information Systems Laboratory, Stanford University; Signals, Systems and Computers, 2000, Conference Record of the Thirty-Fourth Asilomar Conference; ISBN: 0-7803-6514-3; Aug. 6, 2002; pp. 939-945, vol. 2, Stanford, CA.

Jessica Heyman; "Intercell Interference Management in an OFDM-based Downlink"; Institutionen for systemteknik, Department of Electrical Engineering, Linkopings universitet, SE-581 83 Linkoping, Sweden; p. 1-123; 2006.

* cited by examiner

UPLINK COORDINATED INTER-CELL INTERFERENCE CANCELLATION

TECHNICAL FIELD

The present invention generally relates to radio communication systems, devices, software and methods and, more particularly, to mechanisms and techniques for inter-cell interference cancellation for uplink communication in a telecommunication network.

BACKGROUND

During the past years, the interest in radio access technologies for providing services for voice, video and data has increased. There are various telecom technologies used in cellular communications. Widespread radio access technologies for mobile communication are digital cellular. Increased interest is shown in 3G (third generation) systems. Within the $3^{rd}$ generation partnership program (3GPP), the standard for 3G long term evolution (LTE) system has been developed and can be found in 3GPP TR 36.300, Evolved Universal Terrestrial Radio Access (E-UTRA) and Evolved Universal Terrestrial Radio Access (E-UTRAN); Overall description; Stage 2, V8.2.0., the entire content of which is incorporated herein by reference. It is envisioned that a future LTE-Advanced system will be based on LTE and that it will fulfill or exceed the IMT-Advanced requirements.

The LTE concept is based on orthogonal frequency division multiplexing (OFDM) for the downlink (i.e., the communication link from a base station to a terminal) and discrete Fourier transform spread OFDM (DFTS-OFDM) for the uplink (i.e., the communication link from the terminal to the base station). The uplink transmissions from different terminals (for example mobile stations) may be performed on a shared physical channel. Uplink transmissions are kept orthogonal by a scheduler located in the base station. The scheduler provides the transmitting mobile stations with uplink transmission grants that do not overlap in the shared time and frequency resource. Since the uplink transmissions are under tight control of the scheduling base station, there is an inherent delay of (at least) one transmission time interval (TTI) in the uplink. More specifically, the base station signals first the grants for uplink transmissions to the terminals using the downlink control channel or other channels. Then, the terminals need some time to decode the downlink control information received from the base stations before the terminals may transmit data on the granted resource, back to the base station.

Thus, there is a delay in all terminals when transmitting information to the base station due to the architecture of the uplink transmissions. The presence of multiple terminals communicating with the same base station and the implications of this scenario are discussed later, after other concepts of the LTE are discussed.

Within 3GPP, the work on an evolved high speed packet access (HSPA) concept is ongoing, as described for example in R1-080909, Requirements for E-DCH TDM support, Ericsson, the entire content of which is incorporated by reference. The uplink concept in HSPA is also based on a scheduler present in the base station. The scheduler issues grants for uplink transmission and these grants are sent to the terminals. However, the control of the uplink channel usage in HSPA is not as tight as in LTE. The grants issued in HSPA represent a maximum rate that a terminal is allowed to transmit with. If a terminal does not need to transmit at the granted rate, the terminal may transmit at a lower rate (including rate zero) then what the grant stipulates.

Simultaneous transmissions in the HSPA uplink are not orthogonal and thus, the scheduler has to issue grants (i.e., maximum transmission rates) such that the total uplink interference level is kept under control. In order to support higher data rates, the developers of the HSPA concept are considering introducing time domain multiple access (TDMA) in the uplink. With TDMA, the uplink of an evolved HSPA system may become similar to the orthogonal uplink of LTE.

Both the LTE and evolved HSPA processes discussed above support the concept of multi user multiple input multiple output (MU-MIMO), which is described in R1-080774, UL MU-MIMO scheduling for high mobility, Nortel, the entire content of which is incorporated here by reference. As with ordinary MIMO, i.e., transmission and reception from multiple antennas disposed at least at one of the receiver or transmitter, the MU-MIMO arrangement is used to increase the transmitted data rate on the communication channel. Since each terminal is equipped with at least one transmit antenna, a multiple user uplink is multiple input by nature. By scheduling two or more uplink users on the same physical resource, while assuring that the base station is equipped with a large enough number of receiving antennas, possibilities for spatial separation of the transmitting users are created by a receiver making use of traditional MIMO processing.

However, the increased transmission data rate in MU-MIMO arrangements that use either LTE or HSPA comes with a price in terms of increased received complexity. In the following, a serving base station refers to that base station to which a given terminal is connected and a neighboring base station is a station from which the terminal may receive an interfering signal but this base station is not providing the communication data to the terminal.

Inter-cell interference is one aspect of the broad interference phenomenon that affects a communication system. The inter-cell interference is illustrated in FIG. 1 and is produced by signals A and B from at least two terminals 10 and 12 that are in two different cells 14 and 16. The signals A and B are received by a same base station 18, i.e., a serving base station 18 for terminal 10 and not for terminal 12. In this regard, in an LTE system, a cell maintains a list of neighbor cells which is relevant for handover candidates. For each neighbor, the cell may store cell identities (for example a non-unique physical identity used when reporting measurements and a unique identity), connectivity information (e.g., an IP address of the eNB associated with the neighbor cell, the connectivity between eNBs, (i.e., X2 or S1 interfaces in LTE), and additional cell-specific information (e.g., handover algorithm details, type of cell, etc).

One way to manage the inter-cell interference is to control the transmission power to reduce the interference. Other ways to manage the inter-cell interference is to use one of inter-cell interference randomization, cancellation or coordination. Each of these methods aim at minimizing the degradation of the signals caused by the inter-cell interference. For example, inter-cell interference randomization methods may make use of cell-specific scrambling codes and/or cell-specific interleaving sequences to whiten the interference.

Inter-cell interference cancellation is based on detecting inter-cell interference and subtracting it from a received signal. Inter-cell interference coordination is based on coordinating transmission between cells in a static, semistatic or dynamic way for reducing the interference. Such coordination may require restrictions on resource allocation, for example on time and frequency resources and transmit power on those resources. The above noted inter-cell interference methods are discussed in more details in "Intercell interference management in an OFDM-based downlink," J. Heyman, Master thesis, Linköpings universitet, Department of Electrical Engineering, 2006, the entire content of which is incorporated herein by reference. However, because interference coordination methods aim at avoiding interference while interference cancellation methods aim at removing interference, these methods are different, even though they address the same problem. Typically, the use of interference cancellation methods provides higher system capacity than interference coordination methods.

While MU-MIMO is a promising technique that enables spatial processing of intra-cell interference, this technique does not address the problem of inter-cell interference. Further, the above discussed uplink inter-cell interference coordination techniques operate on a slow time scale compared to the change rate of the uplink grant assignments issued by the schedulers, which defeats the purpose of the inter-cell interference reduction techniques.

Accordingly, it would be desirable to provide devices, systems, and methods that address the above mentioned shortcomings, problems and drawbacks and also provide a solution that enhances the performance of uplink transmissions in a communication system.

SUMMARY

According to one exemplary embodiment, there is a method for joint multi-user processing in a first base station of a telecommunication network, which includes at least a second base station and first and second terminals served by the corresponding first and second base stations. The method includes issuing, at the first base station, a first uplink transmission grant for the first terminal; receiving, at the first base station, from the second base station scheduling information about an uplink transmission of the second terminal, where an uplink transmission grant for the uplink transmission of the second terminal is issued by the second base station; and jointly decoding, at the first base station, an uplink transmission from the first terminal and the uplink transmission from the second terminal, which is not served by the first base station, based on the received scheduling information about the uplink transmission of the second terminal.

According to another exemplary embodiment, there is a first base station configured for joint multi-user processing, the first base station being part of a telecommunication network that includes at least a second base station and first and second terminals served by the corresponding first and second base stations. The first base station includes a scheduling device configured to issue a first uplink transmission grant for the first terminal; an input device configured to receive from the second base station scheduling information about an uplink transmission of the second terminal, wherein an uplink transmission grant for the uplink transmission of the second terminal is issued by the second base station; and a processor connected to the scheduling device and the input device and configured to jointly decode an uplink transmission from the first terminal and the uplink transmission from the second terminal, which is not served by the first base station, based on the received scheduling information about the uplink transmission of the second terminal.

According to still another exemplary embodiment, there is a first base station configured for joint multi-user processing, the first base station being part of a telecommunication network that includes at least a second base station and first and second terminals served by the corresponding first and second base stations. The first base station includes means for issuing a first uplink transmission grant for the first terminal; means for receiving from the second base station scheduling information about an uplink transmission of the second terminal, wherein an uplink transmission grant for the uplink transmission of the second terminal is issued by the second base station; and means for jointly decoding an uplink transmission from the first terminal and for decoding the uplink transmission from the second terminal, which is not served by the first base station, based on the received scheduling information about the uplink transmission of the second terminal.

According to another exemplary embodiment, there is a computer readable medium storing computer executable instructions, wherein the instructions, when executed by a processor of a first base station of a telecommunication network, which includes at least a second base station and first and second terminals served by the corresponding first and second base stations, cause the processor to jointly process signals from multi-users. The instructions include issuing, at the first base station, a first uplink transmission grant for the first terminal; receiving, at the first base station, from the second base station scheduling information about an uplink transmission of the second terminal, where an uplink transmission grant for the uplink transmission of the second terminal is issued by the second base station; and jointly decoding, at the first base station, an uplink transmission from the first terminal and the uplink transmission from the second terminal, which is not served by the first base station, based on the received scheduling information about the uplink transmission of the second terminal.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of LTE systems. However, the embodiments to be discussed next are not limited to these systems but may be applied to other existing telecommunications systems.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification are not necessarily all referring to the same embodiment. Further, the particular features, structures or characteristics may be combined in any suitable manner in one or more embodiments.

Figure 1:
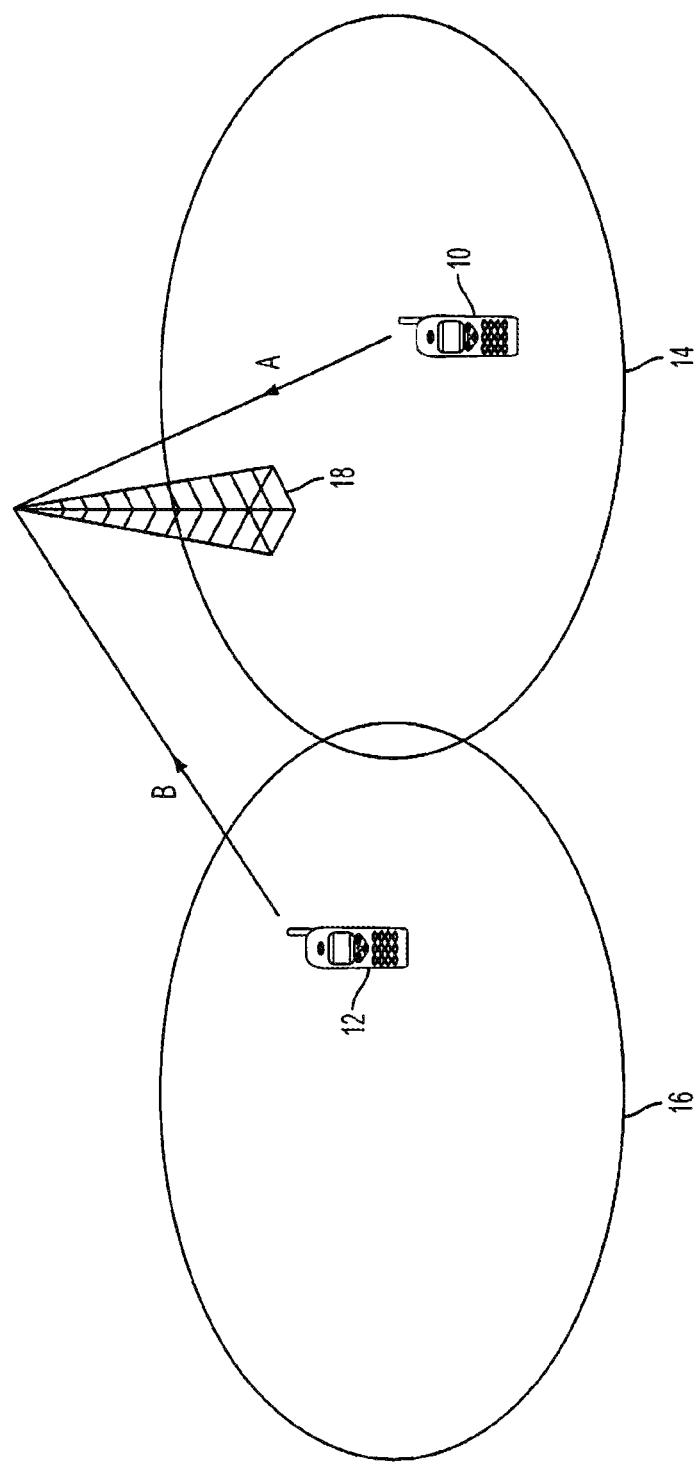
FIG. 1 is a schematic diagram of a communication system including a base station and terminal according to an exemplary embodiment.
Figure 2:
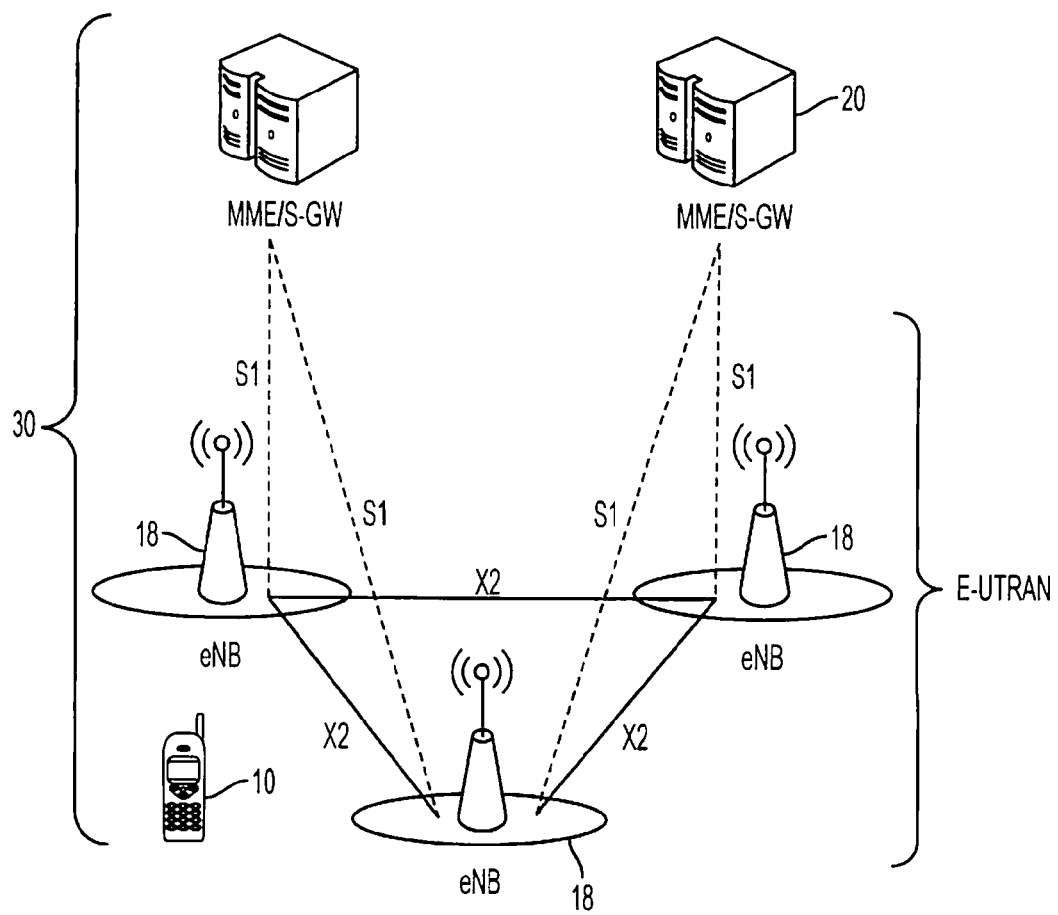
FIG. 2 is a schematic diagram of a base station in an LTE system.

As shown in FIG. 2, according to an exemplary embodiment, a general LTE telecommunication system includes the base stations 18 and Mobility Management Entities (MME) 20 that are connected via interface S1 to the base stations 18. The MME 20 are configured to manage the mobility of the terminals 10 and 12. MME 20 may also be configured to perform authorization and authentication. Together or separate with the MME 20 is provided a logical gateway entity S-GW 20 which acts as a mobility anchor, forwarding and receiving packets to and from the base station 18.

The base stations in LTE systems are denoted eNB and they are capable of communicating directly with each other over an X2 interface or via the MME 20 over the S1 interface. Thus, these interfaces, which are ordinary implemented as wired interfaces, may be used by the base stations or other parts of the network to synchronize the base stations. However, the following exemplary embodiments are also applicable to systems with asynchronous base stations. For simplicity, the system with synchronized base stations is discussed next.

In LTE systems 30 the uplink transmissions are tightly controlled by node eNB 18. Hence, as discussed in the Background section, there is a delay between the time when the scheduling decision is taken in the eNB and the corresponding uplink transmission by the terminal is performed. Potentially, there is intra-cell interference among the multiple users connected to the same eNB, which is accentuated by the MIMO characteristics of the uplink multiple user channel. Thus, a novel solution for reducing or cancelling the inter-cell interference associated with the multiple users connected to a serving eNB, is using the existing delay introduced by the scheduler to inform selected neighboring eNBs of the serving eNB about the transmission format of selected terminals of the serving eNB. According to this novel solution, the scheduling may still be performed independently in each eNB as before, but the inherent delay of the uplink is used to distribute information about coming uplink transmissions of the terminals to eNBs that will become interfered by these terminals.

In other words, according to an exemplary embodiment, the time delay introduced by the scheduler in a given eNB is used to inform selected neighbor eNBs about communications that will occur, between the given eNB and its terminals, such that the selected eNBs may account for those future communications and even may predict the inter-cell interference to take place. Based on this advanced knowledge of the future interfering transmissions, according to another exemplary embodiment, various eNB may be able to cancel the inter-cell interference when this occurs.

Knowledge of the exact uplink format of interfering transmissions (i.e., resource allocation, modulation, channel encoding, scrambling) is used for joint detection (e.g., interference cancellation) of scheduled transmissions of the serving cell and interfering transmissions from neighbor cells. Conventional MU-MIMO receiver algorithms may be used in the serving eNB to jointly receive both transmissions scheduled by the serving eNB as well as interfering transmissions from terminals served by neighboring eNBs.

Figure 3:
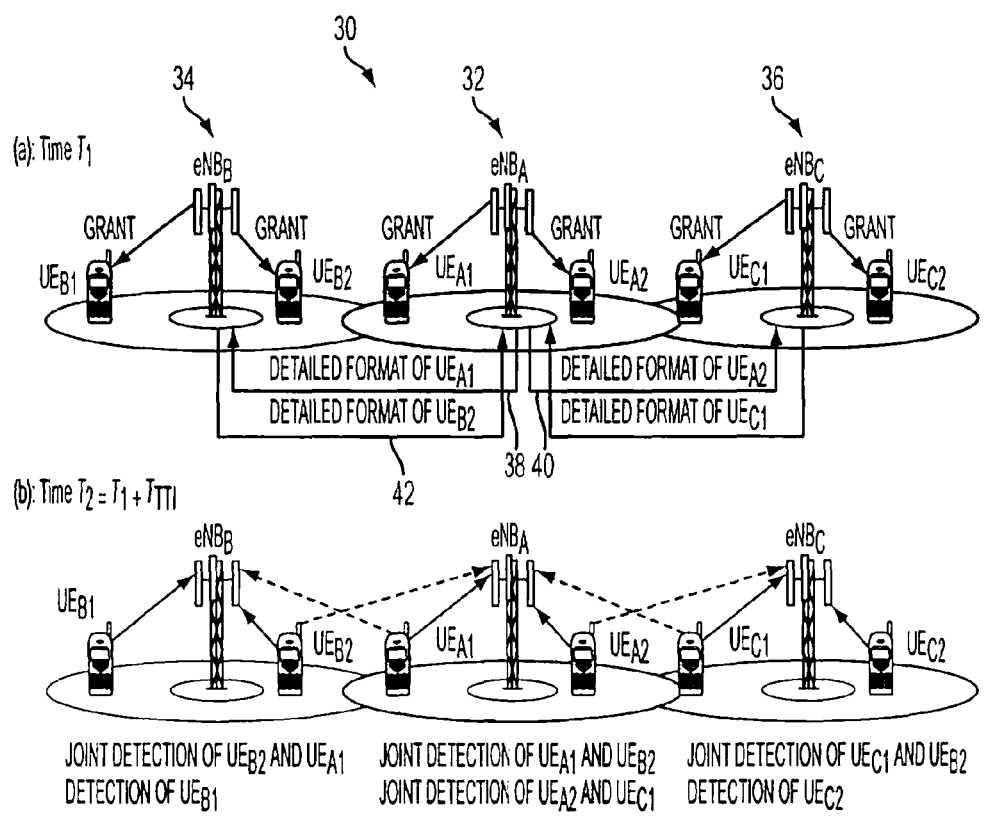
FIGS. 3(a) and 3(b) are schematic diagrams of joint detection of multiple user terminals by base stations at various times according to an exemplary embodiment.

According to an exemplary embodiment, three different eNB nodes 32, 34, and 36 are shown in FIG. 3(a). Each eNB node 32, 34 and 36 acts as a serving node for the corresponding terminals. FIG. 3(a) shows terminals $UE_{A1}$ and $UE_{A2}$ being served by node $eNB_A$ 32, terminals $UE_{B1}$ and $UE_{B2}$ being served by node $eNB_B$ 34, and terminals $UE_{C1}$ and $UE_{C2}$ being served by node $eNB_C$ 36. FIG. 3(a) shows the system 30 at time $T_1$, when the base station $eNB_A$ and the two neighboring base stations $eNB_B$ and $eNB_C$ have performed their scheduling decisions and are signaling the uplink grants to the corresponding mobile stations (i.e. $UE_{A1}$, $UE_{A2}$, $UE_{B1}$, $UE_{B2}$, $UE_{C1}$, and $UE_{C2}$ where $UE_{Xi}$ is used to denote the $i^{th}$ UE served by $eNB_X$) on the downlink control channel.

During the scheduling, i.e., the delay in the system, the $eNB_A$ sends information about the upcoming transmission of $UE_{A1}$ to some or all neighboring base stations. In the exemplary embodiment illustrated in FIG. 3(a), the information regarding the upcoming transmissions from $UE_{A1}$ is sent only to the eNB that will be most interfered by this transmission, i.e., $eNB_B$, via a link 38. This link 38 may be the X2 or S1 interfaces discussed with regard to FIG. 2. The information to be transmitted to a given interfered neighboring base station will be discussed later. The $eNB_A$ in FIG. 3(a) also sends information via a link 40 regarding another scheduled mobile station $UE_{A2}$ to the neighboring base station $eNB_C$ that will be mostly interfered by this transmission. The link 40 may be the X2 or S1 interfaces discussed with regard to FIG. 2. Although FIG. 3(a) shows that information about all terminals of node eNB 32 is transmitted to other nodes eNBs. It is noted that the number of terminals for which information is sent from the serving base station to a non-serving base station depends on the potential inter-cell interference that the terminal will generate, and may include all, less then all, a few, one or none of the served terminals. The same is true for the selection of the neighboring nodes eNBs.

According to an exemplary embodiment, the base stations that are neighbors to $eNB_A$ operate in the same way as the $eNB_A$. Thus, the $eNB_A$ receives information from $eNB_B$ regarding the upcoming transmission of the mobile station $UE_{B2}$, as well as information from the $eNB_C$ regarding the upcoming transmission of $UE_{C1}$. According to this exemplary embodiment, at time $T_1$ when the information from neighboring base stations is received at $eNB_A$, the scheduling decisions in $eNB_A$ were already taken for the upcoming transmission time interval (TTI).

FIG. 3(b) shows the same system 30 as shown in FIG. 3(a) but at a later time, i.e., time $T_2$ when the terminals were granted rights to uplink transmit (in FIG. 3(a)). The terminals transmit at time $T_2$, using their granted resources. Assume that in $eNB_A$ an observation is made that when detecting the transmission from the served $UE_{A1}$, the interference from the non-served $UE_{B2}$ is dominating. According to an exemplary embodiment, a decision is therefore made in $eNB_A$ that the detection of $UE_A$, and $UE_{B2}$ shall be performed jointly. Joint multi-user processing, which may include one or more of demodulation, detection, decoding, etc., implies that a signal received from one user is processed based on an input from the other users. In other words, joint two users processing uses information from the second user to process the signal from the first user and vice versa. A joint multi-user processing is different than sequentially processing multiple users, one by one, without any coordination among the signals from the user. Because the transmission format of $UE_{B2}$ (including reference symbols for channel demodulation) is known at $eNB_A$ from $eNB_B$ via link 42, system 30 performs MU-MIMO detection of the transmissions from $UE_{A1}$ and $UE_{B2}$. In this exemplary embodiment, it was assumed that the transmissions of $UE_{A1}$ and $UE_{A2}$ are performed on non-overlapping frequency resources and hence, the transmission from $UE_{A2}$ does not have to be taken into the joint detection of $UE_{A1}$ and $UE_{B2}$. Also, the transmission from $UE_{C1}$ is assumed to be irrelevant (low) for the joint detection of $UE_{A1}$ and $UE_{B2}$ in $eNB_A$ in this example.

However, if the transmissions from $UE_{A2}$ and $UE_{C1}$ affect the inter-cell interference, the system 30 may be configured to determine these transmissions as well. Similar decisions on which users need to be jointly detected are performed in $eNB_B$ and $eNB_C$. For example, the $eNB_B$ may determine that the transmission from $UE_{B1}$ can be made alone while the transmissions from $UE_{B2}$ and $UE_{A1}$ need to be detected jointly. In a further example, the $eNB_C$ may determine that the transmissions from $UE_{A2}$ and $UE_{C1}$ need to be jointly detected while the transmission from $UE_{C2}$ may be detected alone. Other combinations of detections are also possible, depending on a real situation.

According to an exemplary embodiment, each eNB station decides which neighboring base stations to inform about an upcoming uplink transmission of served terminals. This decision may be made based on measurements performed by the served terminals. The type of terminal measurements to be performed and used in the decision may be similar to those used for handover, i.e., when the terminal is physically moving from a cell to another cell. However, the criteria for triggering when a terminal starts to measure the neighboring cells and when a measurement is to be reported to the serving base station may be different compared to the handover case.

Figure 4:
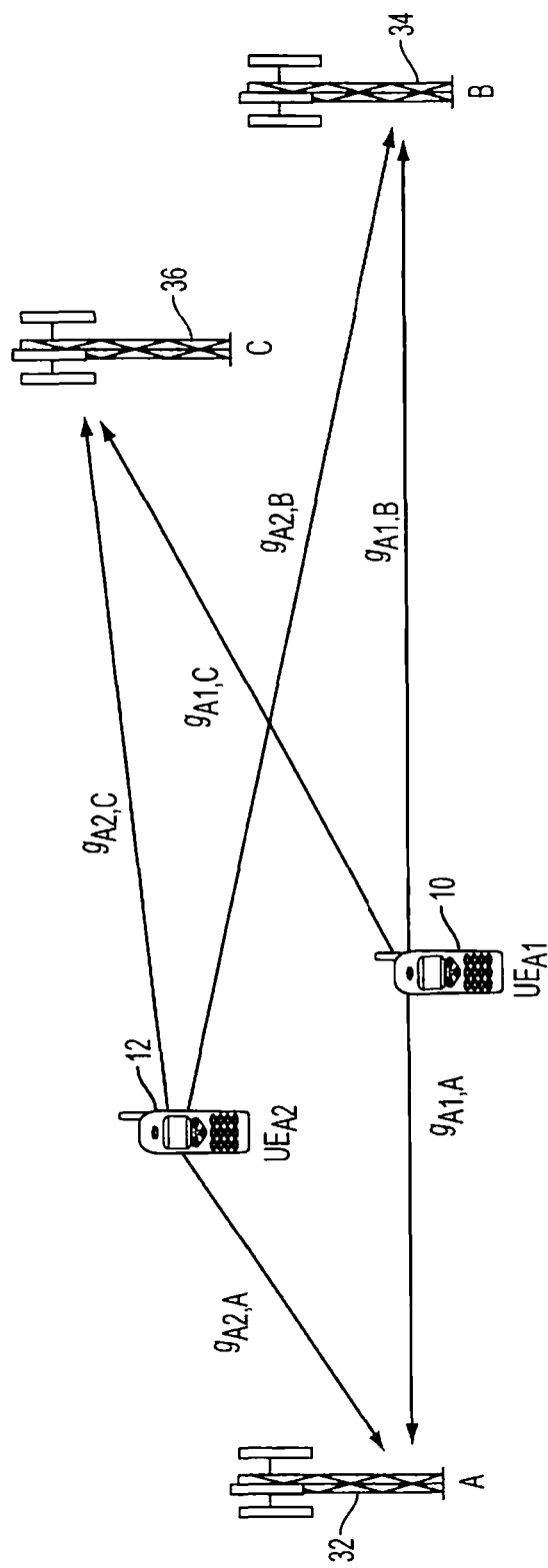
FIG. 4 is a schematic diagram illustrating detection of interfered neighboring cells.

According to an exemplary embodiment shown in FIG. 4, the terminal 10 and 12 (i.e., $UE_{A1}$ and $UE_{A2}$ in this example) perform and report inter-cell gain measurements to the serving node $eNB_A$. Other measurements are also possible. In this exemplary embodiment, the first terminal 10 reports a first measurement $g_{A1}=[g_{A1,B}, g_{A1,C}]$ to the serving node eNB 32 and the second terminal 12 reports a second measurement $g_{A2}=[g_{A2,B}, g_{A2,C}]$ to the same serving node eNB 32. Each terminal 10 and 12 reports in this exemplary embodiment, measurements from neighboring nodes 34 and 36. According to another exemplary embodiment, terminals $UE_{A1}$ and $UE_{A2}$ report only the identity of the strongest neighboring base station. From these measurements, the measuring terminal 10 may be associated with those neighboring cells 34 that are most interfered by the measuring terminal. Based on this association, the most interfered neighboring cells 34 are notified by the serving node 32 about the future transmission of the served terminal 10 and the serving node 32 receives at its turn, the same information about terminals in neighboring cells. Based on this information, the transmissions from the most interfering neighboring cells are cancelled (after being jointly detected with the served terminals by the serving base) in case that these transmissions overlap in the time and frequency domain with the transmission of the terminal. In another exemplary embodiment, all cells are informed about a terminal in any given cell.

According to an exemplary embodiment, by only informing the most interfered neighboring cells about a granted uplink transmission instead of all neighboring cells, the amount of base station to base station communication is reduced. To decide which interfering terminals (not served) to consider when performing detection of a particular served terminal, the base station may select only the interfering terminals from the most interfering cells. Alternatively, because the demodulation reference signals of all interfering terminals are known, the eNB may first detect the received interference power from each interfering terminal and then decide to include the most interfering terminals based on the measurements. One reason to limit the number of interfering terminals that are included in the joint detection step is to reduce the computational effort required for the detection of the neighbor nodes eNBs.

In another exemplary embodiment, the complexity of detecting the transmissions from a particular terminal may be reduced by not including all possible transmissions when performing joint detection (i.e., MU-MIMO detection). Transmissions that are not overlapping in time or frequency are also not included.

Figure 5:
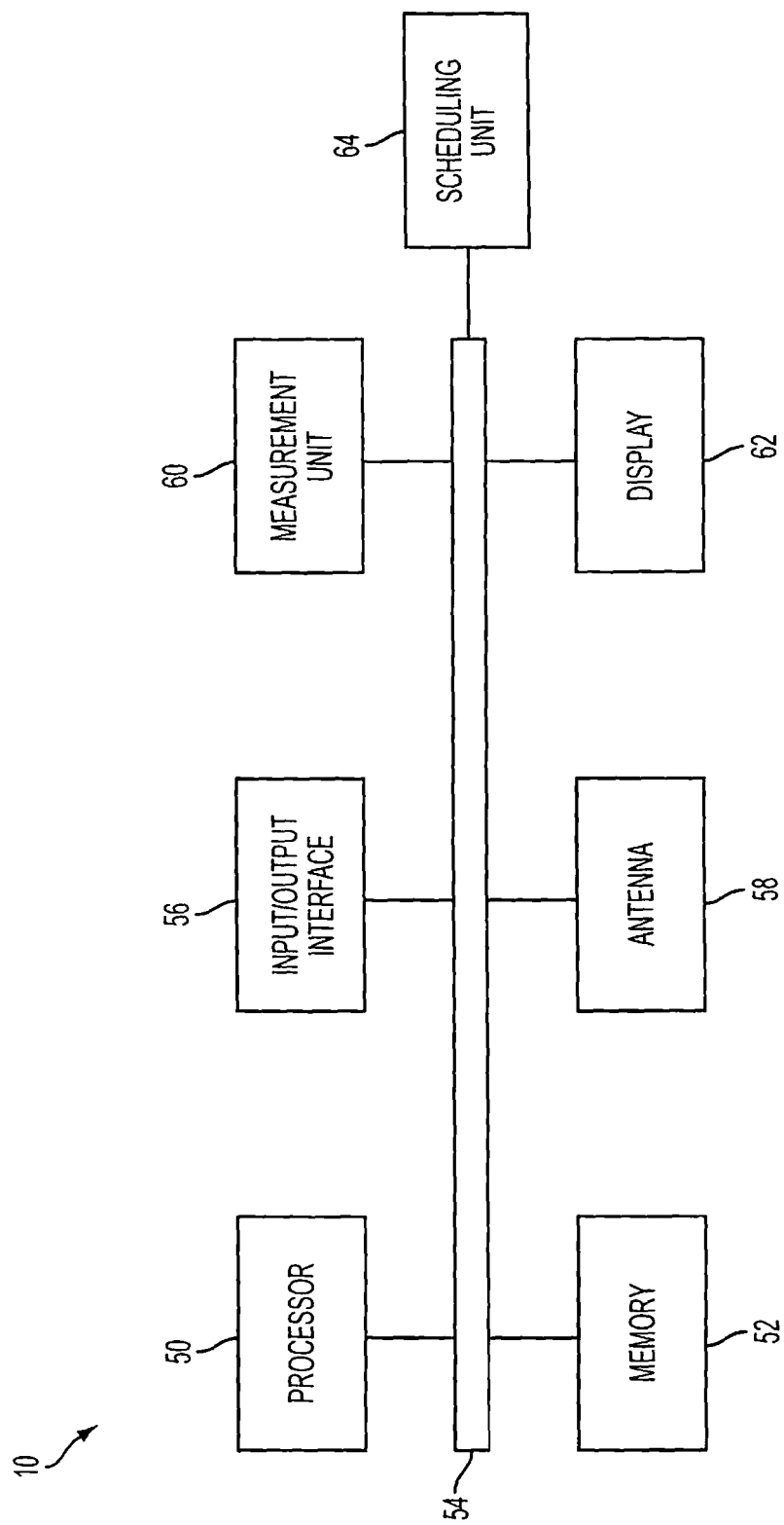
FIG. 5 is a schematic diagram of parts of a base station or terminal according to an exemplary embodiment.

Prior to describing the operation of system 30, a structure of the terminal and/or the eNB is first discussed. According to an exemplary embodiment shown in FIG. 5, a terminal (user equipment) 10 includes a processor 50 that is connected to a memory 52 via a bus 54. The processor 50 is configured to execute various programs related to communication (i.e., coding, decoding, transmitting, receiving, etc.) stored in the memory 52. The terminal 10 may include an input/output interface 56, via which a user may input commands or instructions. The interface 56 may be a mouse, a keyboard, a microphone, a camera, etc. The terminal 10 may include an antenna 58 for performing wireless communication with a base station. A measurement unit 60, which also may be included in the terminal 10, may be used for measuring various parameters of a base station or another terminal 12. The terminal 10 may also include a display. The base station 18 may include one or a combination of the terminal 10 elements and a scheduling unit 64. The scheduling unit 64 may be configured to schedule uplink and downlink channel between a base station and corresponding user terminals.

According to an exemplary embodiment shown in FIG. 6, the operation of the system 30 is discussed next. For simplicity and to provide a better understanding, the system 30 is considered to be made of two nodes eNBs 32 and 34 and two terminals 10 and 12. Node $eNB_A$ 32 sends in step 70 a measurement configuration message to terminal 10. In this step, the serving node $eNB_A$ 32 informs the served terminal $UE_{A1}$ 10 to perform and report measurements on neighboring cells. According to an exemplary embodiment, neighboring cell measurements include estimates of the reference symbol received power (RSRP) of a neighboring base station. Other parameters may also be measured by the terminal. After the terminal $UE_{A1}$ performs the requested measurements in step 72, the terminal reports back in step 74 to the node $eNB_A$ that, for example, node $eNB_B$ is the strongest neighbor.

Node $eNB_A$ calculates and issues in step 76 an uplink transmission grant to terminal $UE_{A1}$. The grant may be transmitted in step 78 on the downlink control channel to terminal $UE_{A1}$. In step 80, node $eNB_A$ informs node $eNB_B$ (over the X2 interface or the S1 interface in case of LTE), indicated by the terminal $UE_{A1}$ as being a neighbor strongly interfered by terminal $UE_{A1}$, about the grant issued or to be issued to terminal $UE_{A1}$ such that node $eNB_B$ may prepare for potential interference from $UE_{A1}$. The same is true about terminal $UE_{B1}$ and node $eNB_B$. However, the grant to the terminal to uplink transmit is issued in this embodiment by node $eNB_A$, prior to receiving information about future uplink transmissions from a neighboring node. Thus, node $eNB_A$ does not modify in this exemplary embodiment its scheduling based on information received from other nodes.

Next, node $eNB_A$ receives in step 82 information about a granted, but still upcoming, transmission of terminal $UE_{B1}$ in node $eNB_B$. Similar steps that take place between terminal $UE_{A1}$ and node $eNB_A$ may take place between other nodes and corresponding terminals, for example, node $eNB_B$ and terminal $UE_{B1}$ as also shown in FIG. 6. Steps 78, 80, and 82 may be performed in this order in time, in a reverse order or simultaneously. In step 84, the terminals $UE_{A1}$ and $UE_{B1}$ both transmit using their granted resource. Part of the transmission from terminal $UE_{A1}$ arrives at node $eNB_B$ in step 86 as interference. The same is true about the transmission from terminal $UE_{B1}$, a part of which arrives in step 88 as interference at node $eNB_A$. After the transmissions from the terminals, node $eNB_A$ estimates the received power of the interfering transmission from terminal $UE_{B1}$ in step 90. Suppose that node $eNB_A$ determines that the received power is significant (e.g., above a preset threshold). Then, node $eNB_A$ cancels in step 92 the inter-cell interference produced by terminal $UE_{B1}$ and detects in step 94 the transmission from it own terminal $UE_{A1}$, clear of interference.

The joint detection discussed in this exemplary embodiment includes detecting the strongest interferer (the transmission from node $eNB_B$ in this case) and decoding the strongest interferer. If the decoding is successful, the joint detection further includes removing the interference from the transmission by cancelling the interference from the dominant interferer from the received signal. The detection of the signal transmitted from $UE_{A1}$ may then be performed as if the interferer $UE_{B1}$ did not transmit anything. Although FIG. 6 shows the joint detection of only two terminals, the exemplary embodiments may be extended to joint detection algorithms for MU-MIMO systems.

In another exemplary embodiment, node $eNB_A$ does not inform all the neighboring cells about the uplink transmission of $UE_{A1}$ but only selected cells. The cells to be informed are selected from the interfered cells and the physical position of $UE_{A1}$ in the cell may be correlated with the position of the selected interfered cells such that only those interfered cells located closest to $UE_{A1}$ are selected by $eNB_A$ to be informed about the transmission from $UE_{A1}$.

Figure 7:
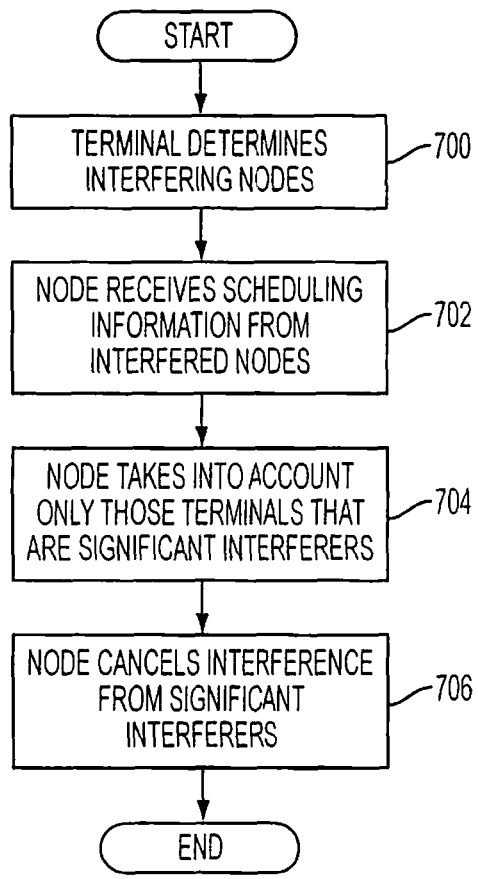
FIG. 7 is a schematic diagram illustrating actions performed by a base station for cancelling interference according to an exemplary embodiment.

According to an exemplary embodiment, the serving node $eNB_A$ receives information related to all terminals served by other cells, which have identified the node $eNB_A$ as the most interfered neighboring cell. From this set of terminals, node $eNB_A$ considers only a subset of terminals, i.e., those terminals that have been identified as significant interferers. More specifically, according to this embodiment and as shown in FIG. 7, one or more nodes determine in step 700 neighboring nodes that are interfered by the transmission of data from the served terminals. For the simplicity of the discussion, a single serving node is considered instead of the one or more nodes. The serving node determines the interfered nodes by instructing the served terminals to perform measurements of the neighboring nodes. Based on these measurements, the serving node determines which neighboring nodes are interfered by the transmission of the terminal that performed the measurements. The serving node receives in step 702 scheduling information from nodes that are going to interfere with the served terminals. These nodes determine that the serving node would be interfered by their terminals in a manner similar to the one just discussed above with regard to the serving node in step 700. Based on this scheduling information, the serving node takes in step 704 into consideration only information from those terminals that are significant interferers, e.g., the interference level is about a preset threshold. In step 706 the serving node cancels the interference associated with the significant interferers as the serving node has enough information available to decode non-served terminals, i.e., the interfering terminals.

However, in another exemplary embodiment, the serving node sends a measurement configuration to the served terminals and this measurement configuration specifies report triggering events, e.g., the terminal measures parameters of the neighboring cell only if a certain condition, to be discussed next, is meet. In one exemplary embodiment, the report instructs the terminals to report measuring of the neighboring cell when the RSRP of the neighboring cell becomes sufficiently strong relative to the RSRP of the serving node $eNB_A$, i.e., $$\text{RSRP\_neighbor} \leq (\text{RSRP\_eNB}_A - \text{Threshold\_1}). \quad (1)$$

In another exemplary embodiment, the report instructs the terminals to also report measurements of the neighboring cell if the RSRP of the neighboring cell becomes significantly less strong relative to the RSRP of the serving node $eNB_A$, i.e., $$\text{RSRP\_neighbor} < (\text{RSRP\_eNB}_A - \text{Threshold\_2}). \quad (2)$$

Figure 8:
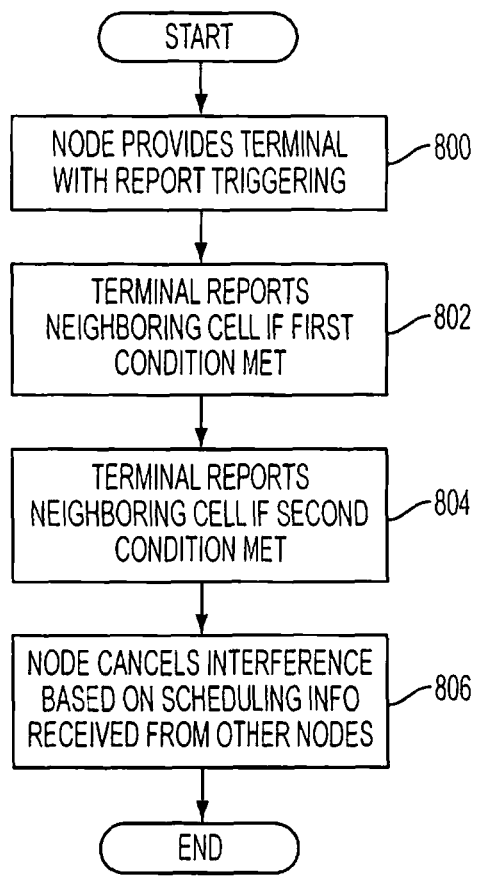
FIG. 8 is a schematic diagram illustrating actions performed by the base station for cancelling interference according to another exemplary embodiment.

If the event according to (2) is triggered after the event according to (1) then the corresponding cell is no longer significantly interfered by the reporting UE and hence it does not need further information related to scheduled uplink transmissions from that particular UE. The hysteresis threshold quantities Threshold_1 and Threshold_2 may vary from cell to cell and may be preset depending on the particular conditions of the system. FIG. 8 illustrates a possible configuration of at least one node based on the above examples. More specifically, in step 800, the node provides the served terminals with the report triggering events, in step 802 the terminals evaluate the first trigger condition (1) and report the measurements of the neighboring cells if the trigger condition (1) is meet. In step 804, the terminals evaluate the second trigger condition (2) and report the measurements of the neighboring cells if the trigger condition (2) is meet. One or a combination of conditions may be used to instruct the terminals when to measure a neighboring cell. Based on the information received in steps 802 and 804, the serving node informs the neighbor cells likely to be interfered about the transmissions from the served terminals. In step 806, the serving node, using scheduling information from other nodes whose terminals are interfering with the serving node, cancels the interference produced by the interferers.

In one exemplary embodiment, one terminal may report more than one neighboring node eNB for which the terminal is a significant interferer. Thus, the serving node eNB is aware of which of its own terminals are potentially strong interferers and inform accordingly the interfered neighboring cells. Further, the measurement and report configurations may be sent only to selected terminals, e.g., terminals which are expected to use high powers, high data rate, etc., and not to terminals that are not expected to constitute significant interferers, e.g., VoIP users. Moreover, the triggering thresholds discussed above may also be terminal-specific, for example, to depend on the expected power level of the terminal. If these exemplary embodiments are implemented in nodes eNB, the signaling between the nodes and terminals is similar to that shown in FIG. 6, but less grant information is sent between eNBs. Thus, in this implementation, each terminal for which grant information is sent to a neighboring eNB is considered as a significant interferer.

Figure 6:
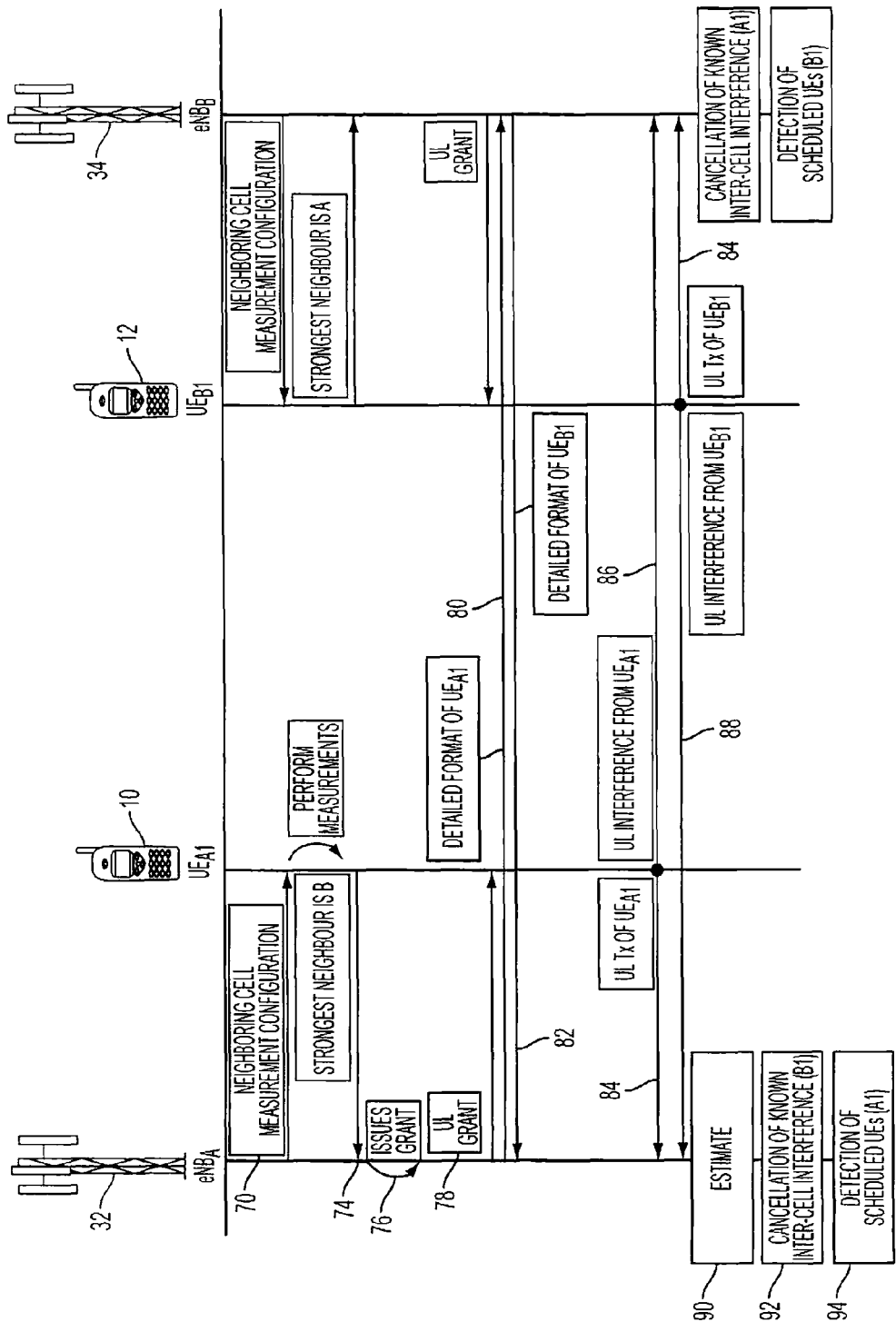
FIG. 6 is a schematic diagram illustrating communications between terminals and corresponding base stations according to an exemplary embodiment.
Figure 9:
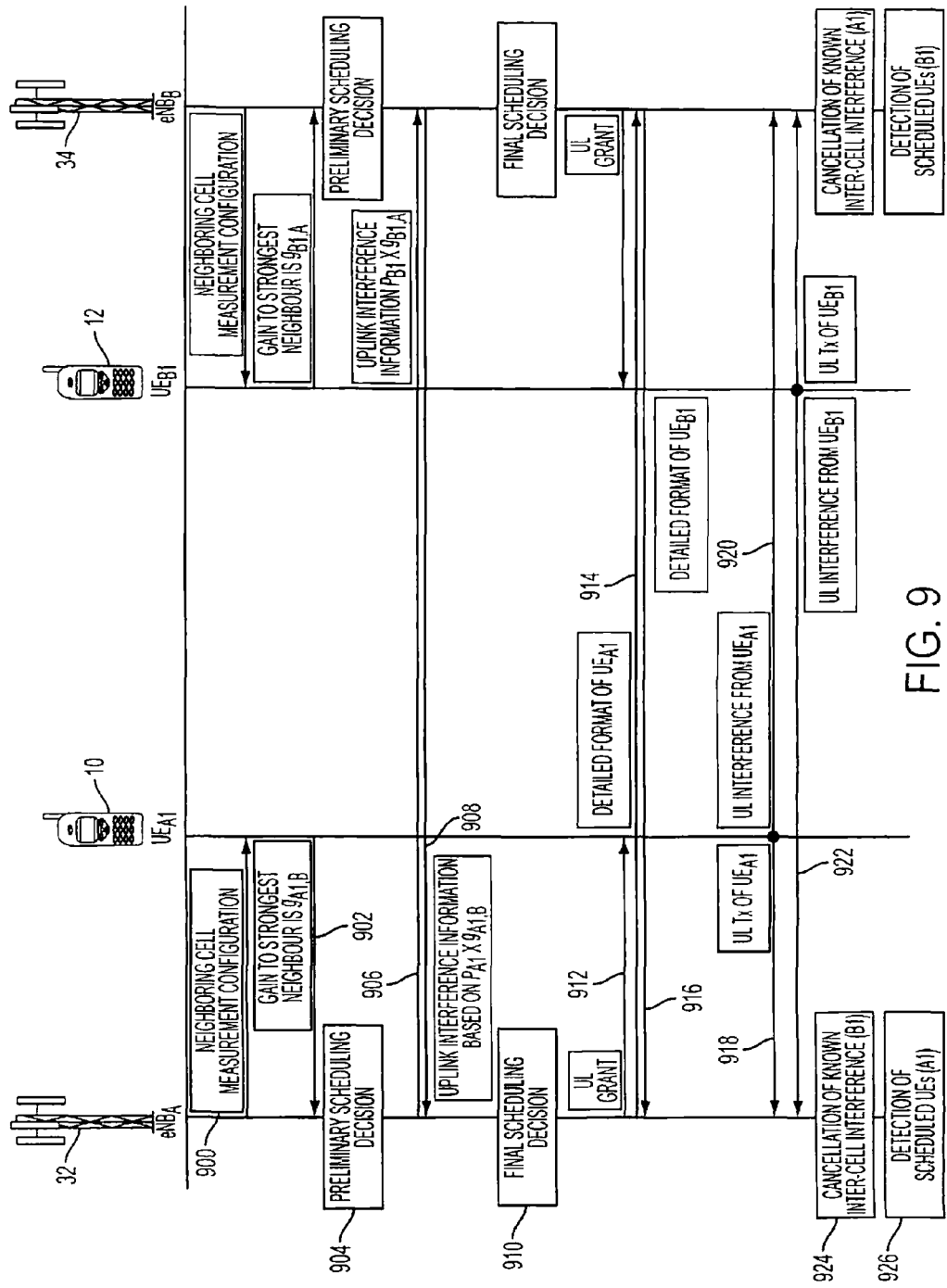
FIG. 9 is a schematic diagram illustrating communications between terminal and corresponding base stations according to an exemplary embodiment.

According to an exemplary embodiment, the operation of system 30 illustrated in FIG. 6 may be modified as illustrated in FIG. 9. More specifically, after the serving base station has received information about transmissions that will occur in the next transmission time interval in neighboring base stations, the serving station may change the link adaptation of the users it has scheduled, i.e., active scheduling. For example, the base station may adjust the modulation and channel coding rate while the power and frequency allocation are kept unchanged from a previous preliminary scheduling decision. Thus, the serving base station may prefer to change the modulation and channel coding rate if the base station determines that a transmission from its terminals might fail when competing with interfering terminals from other cells. The base station may keep the power and frequency allocation, as these values have been transmitted already to neighboring cells.

The operation of system 30 is discussed now in more details with regard to FIG. 9. For simplicity, the discussion focuses on the communication between node $eNB_A$ 32 and terminal $UE_{A1}$ 10. In step 900, node 32 instructs terminal 10 to measure neighboring cells and report not only the identity of the strongest neighboring cell but also the actual downlink path gain estimate to the strongest neighbor (denoted $g_{A1,B}$ for the terminal $UE_{A1}$ in this example). This measurement is reported by the terminal in step 902 and may be reported periodically or event-triggered. The reporting period may be unrelated to the scheduling period.

Based on the received measurement from terminal 10, the base station $eNB_A$ 32, which serves $UE_{A1}$ but not $UE_{B1}$, makes a preliminary scheduling decision in step 904. At this time, the scheduler in node $eNB_A$ 32 does not know what decisions will be taken in the neighboring cells, so the preliminary scheduling decision in node 32 is based on a best guess. The preliminary scheduling decision is distributed in step 906 to relevant neighboring cells. The information that is communicated in step 906 may include the amount of interference that is expected to reach a neighboring base station, which is based on the estimated path-gain to the interfered neighboring base station and the transmit power of the scheduled interfering terminal.

Based on the received information about scheduled transmissions in neighboring cells and how much interference these cells are expected to cause, the base station $eNB_A$ may perform another scheduling decision in step 910. In this step, the base station may introduce some restrictions on how much the final scheduling decision is allowed to differ from the preliminary decision. In an exemplary embodiment, the allocated power and frequency resources are kept constant while the modulation and channel encoding rate may be allowed to be changed. In another embodiment, the restriction may allow a reduction of the allocated power in the final scheduling decision, but not an increase of the power (or only a limited power increase) when compared to the preliminary scheduling decision. Following the scheduling decision in step 910, the base station 32 transmits the uplink grants to the serving terminals in step 912 and also a report about the serving terminals to the neighboring nodes 34 in step 914. The base station 32 receives a similar report in step 916 from neighboring cell 34. The order of steps 912, 914, and 916 in time may as indicated above, in a reverse order or simultaneous.

In step 918, the terminal 10 transmits information via the uplink to the base station 32 and in step 920 the terminal 10 also transmits an interference signal to neighboring cell 34. A similar interference signal is transmitted from non-serving terminal 12 to base station 32 in step 922. In step 924, the base station 32 cancels the interference produced by the terminal 12 and in step 926 the base station detects the information from the served terminal 10 with reduced or no interference from terminal 10.

In view of the exemplary embodiment discussed with reference to FIG. 9, in the context of the exemplary embodiment discussed with reference to FIG. 6, had the information about the scheduling decisions of $eNB_B$ and $eNB_C$ been available to the scheduler in $eNB_A$ when the scheduling decision was taken by $eNB_A$, then the scheduler in $eNB_A$ would likely have produced a different scheduling decision than what it actually did in FIG. 6. If the scheduling decisions are truly distributed, as they are in LTE, then it is not possible for node $eNB_A$ to redo the scheduling taking this additional information into account. The exemplary embodiment discussed with regard to FIG. 6 indicates that the scheduling decisions are independently made in each base station, without any information about simultaneous scheduling decisions in neighboring base stations.

However, there are some variations from the exemplary embodiment of FIG. 6 that are discussed next. Such variations have in common performing the scheduling decision in a base station using information about scheduling decisions of neighboring cells. One such variation is an exemplary embodiment in which relaying is performed. In this exemplary embodiment, it may be a master-slave relationship between a base station and the relays controlled by the base station. The relays may in this case be seen as (slave) neighbors to the (master) base station. Under such a scenario, a system may have master base stations that make scheduling decisions after the base stations have received the scheduling decisions from the slave base stations.

In another exemplary embodiment, the system has the capability to perform iterative distributed scheduling. Each base station in the system may make first a preliminary scheduling decision. The preliminary decision is forwarded to all relevant neighboring base stations. After having received information about the preliminary scheduling decisions of the neighboring base stations, the serving base station may update the preliminary decision to generate a final decision. Several iterations of preliminary decisions (with various and possibly time varying restrictions on how much they may deviate from the previous preliminary decision) are allowed before a final decision is made. According to another exemplary embodiment, in a distributed antenna systems, a central scheduling may take into account transmissions from several different cells. According to another exemplary embodiment, a system may have multiple cells on the same site that are all controlled by one common uplink scheduling unit. The site and the cells may be considerably separated, such as in the main-remote case, where the antenna of the remote cell units samples the signal and sends the information to the main unit, which performs baseband processing. In this case, a central scheduling is also possible.

Figure 10:
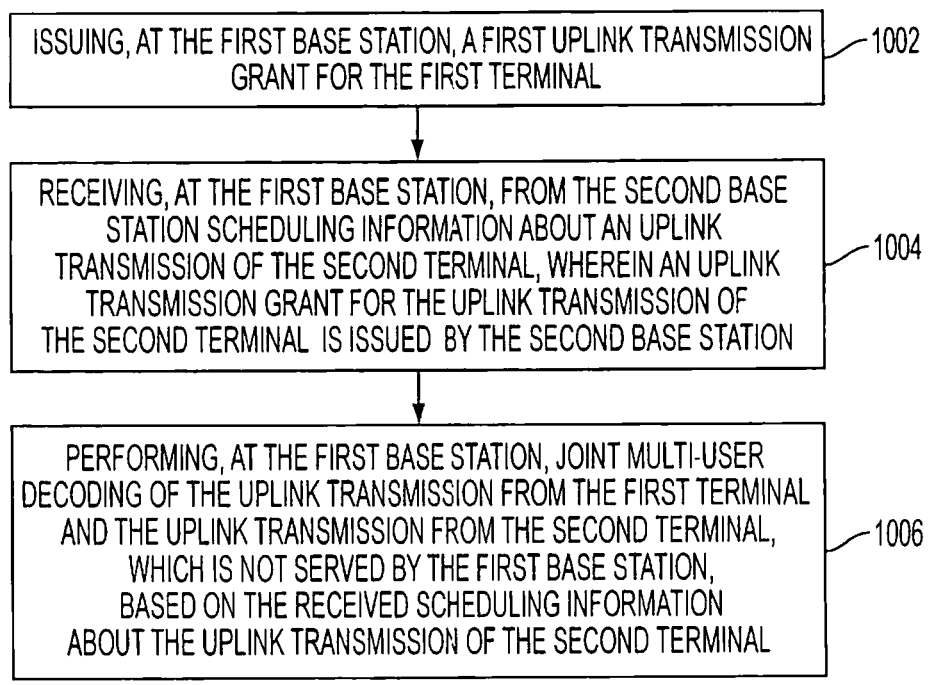
FIG. 10 is a flow diagram showing steps for canceling inter-cell interference in a base station according to an exemplary embodiment.

In another exemplary embodiment, the steps of a method performed by the base station for joint multi-user processing are discussed. With regard to FIG. 10, the method includes issuing in step 1000, at the first base station, a first uplink transmission grant for the first terminal, receiving in step 1002, at the first base station, from the second base station scheduling information about an uplink transmission of the second terminal, wherein an uplink transmission grant for the uplink transmission of the second terminal is issued by the second base station, and performing in step 1004, at the first base station, joint multi-user decoding of the uplink transmission from the first terminal and the uplink transmission from the second terminal, which is not served by the first base station, based on the received scheduling information about the uplink transmission of the second terminal.

The disclosed exemplary embodiments provide a terminal, a system, a method and a computer program product for cancelling inter-cell interference. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

As also will be appreciated by one skilled in the art, the exemplary embodiments may be embodied in a wireless communication device, a telecommunication network, as a method or in a computer program product. Accordingly, the exemplary embodiments may take the form of an entirely hardware embodiment or an embodiment combining hardware and software aspects. Further, the exemplary embodiments may take the form of a computer program product stored on a computer-readable storage medium having computer-readable instructions embodied in the medium. Any suitable computer readable medium may be utilized including hard disks, CD-ROMs, digital versatile disc (DVD), optical storage devices, or magnetic storage devices such a floppy disk or magnetic tape. Other non-limiting examples of computer readable media include flash-type memories or other known memories.

The present exemplary embodiments may be implemented in a terminal, a base station, and generally in a wireless communication network or system comprising both the terminal and the base station. The exemplary embodiments may also be implemented in an application specific integrated circuit (ASIC), or a digital signal processor. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. A processor in association with software may be used to implement a radio frequency transceiver for use in the terminal, the base station or any host computer. The terminal may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

Although the features and elements of the present exemplary embodiments are described in the embodiments in particular combinations, each feature or element can be used alone without the other features and elements of the embodiments or in various combinations with or without other features and elements disclosed herein. The methods or flow charts provided in the present application may be implemented in a computer program, software, or firmware tangibly embodied in a computer-readable storage medium for execution by a general purpose computer or a processor.

What is claimed is:

1. A method for joint multi-user processing in a first base station of a telecommunication network, which includes at least a second base station and first and second terminals served by the corresponding first and second base stations, the method comprising:
   issuing, at the first base station, a first uplink transmission grant for the first terminal;
   receiving, at the first base station, from the second base station scheduling information about an uplink transmission of the second terminal, wherein an uplink transmission grant for the uplink transmission of the second terminal is issued by the second base station, and wherein the receiving step is performed after the issuing step and prior to the decoding, at the first base station, of the uplink transmission from the first terminal; and
   performing, at the first base station, joint multi-user decoding of the uplink transmission from the first terminal and the uplink transmission from the second terminal, which is not served by the first base station, based on the received scheduling information about the uplink transmission of the second terminal, wherein the joint multi-user processing step further comprises:
   decoding, at the first base station, the uplink transmission from the first terminal;
   decoding, at the first base station, the uplink transmission from the second terminal; and
   cancelling, at the first base station, an interference produced by the uplink transmission of the second terminal to the uplink transmission of the first terminal, based on the decoded uplink transmission of the second terminal.

2. The method of claim 1, further comprising:
   instructing the first terminal to detect neighboring base stations that are interfered by a transmission of the first terminal.

3. The method of claim 1, further comprising:
   selecting a subset of the interfered base stations, based on measured inter-cell gains of the neighboring base stations.

4. The method of claim 3, further comprising:
   informing the subset of the interfered base stations about the uplink transmission from the first terminal.

5. The method of claim 1, further comprising:
   instructing the first terminal to detect, only based on a trigger event, neighboring base stations that are interfered by a transmission of the first terminal.

6. The method of claim 1, further comprising:
   issuing, at the first base station, a second uplink transmission grant for the first terminal, based on the received scheduling information about the uplink transmission of the second terminal and on the first uplink transmission grant, wherein the first uplink transmission grant is a preliminary grant that is not sent to the first terminal and the second uplink transmission grant is a final grant that is sent to the first terminal.

7. The method of claim 5, wherein the second uplink transmission grant is different from the first uplink transmission grant in at least one of modulation and channel encoding rate but is identical to the first uplink transmission grant for allocated power and frequency.

8. The method of claim 1, further comprising:
   issuing, at the first base station, a second uplink transmission grant for the first terminal; and
   iteratively distributing scheduling information from the first base station to interfered base stations about the first terminal prior to granting the second uplink transmission grant to the first terminal, wherein the first uplink transmission grant is a preliminary grant and the second uplink transmission grant is a final grant.

9. A first base station configured for joint multi-user processing, the first base station being part of a telecommunication network that includes at least a second base station and first and second terminals served by the corresponding first and second base stations, the first base station comprising:
    a scheduling device configured to issue a first uplink transmission grant for the first terminal;
    an input device configured to receive from the second base station scheduling information about an uplink transmission of the second terminal, wherein an uplink transmission grant for the uplink transmission of the second terminal is issued by the second base station, wherein the input device receives the scheduling information after the scheduling device issues the first uplink transmission grant and prior to the processor decoding the uplink transmission from the first terminal; and
    a processor connected to the scheduling device and the input device and configured to jointly decode an uplink transmission from the first terminal and the uplink transmission from the second terminal, which is not served by the first base station, based on the received scheduling information about the uplink transmission of the second terminal, wherein the processor is further configured to decode the uplink transmission from the first terminal, decode the uplink transmission from the second terminal, and cancel an interference produced by the uplink transmission of the second terminal to the uplink transmission of the first terminal, based on the decoded uplink transmission of the second terminal.

10. The base station of claim 9, wherein the processor is further configured to:
    instruct the first terminal to detect neighboring base stations that are interfered by a transmission of the first terminal.

11. The base station of claim 10, wherein the processor is further configured to:
    select a subset of the interfered base stations, based on measured inter-cell gains of the neighboring base stations.

12. The base station of claim 11, wherein the processor is further configured to:
    inform the subset of the interfered base stations about the uplink transmission from the first terminal.

13. The base station of claim 9, wherein the processor is further configured to:
    instruct the first terminal to detect, only based on a trigger event, neighboring base stations that are interfered by a transmission of the first terminal.

14. The base station of claim 9, wherein the processor is further configured to:
    issue a second uplink transmission grant for the first terminal, based on the received scheduling information about the uplink transmission of the second terminal and on the first uplink transmission grant, wherein the first uplink transmission grant is a preliminary grant that is not sent to the first terminal and the second uplink transmission grant is a final grant that is sent to the first terminal.

15. The base station of claim 14, wherein the second uplink transmission grant is different from the first uplink transmission grant in at least one of modulation and channel encoding rate but is identical to the first uplink transmission grant for allocated power and frequency.

16. The base station of claim 9, wherein the scheduling device is further configured to issue a second uplink transmission grant for the first terminal, and the processor is further configured to iteratively distribute scheduling information to interfered base stations about the first terminal prior to granting the second uplink transmission grant to the first terminal, wherein the first uplink transmission grant is a preliminary grant, and the second uplink transmission grant is a final grant.

17. A method for joint multi-user processing in a first base station of a telecommunication network, which includes at least a second base station and first and second terminals served by the corresponding first and second base stations, the method comprising:
    issuing, at the first base station, a first uplink transmission grant for the first terminal;
    receiving, at the first base station, from the second base station scheduling information about an uplink transmission of the second terminal, wherein an uplink transmission grant for the uplink transmission of the second terminal is issued by the second base station, and wherein the receiving step is performed after the issuing step and prior to the decoding, at the first base station, the uplink transmission from the first terminal; and
    performing, at the first base station, joint multi-user decoding of the uplink transmission from the first terminal and the uplink transmission from the second terminal, which is not served by the first base station, based on the received scheduling information about the uplink transmission of the second terminal, wherein the joint multi-user processing step further comprises:
    decoding, at the first base station, the uplink transmission from the first terminal; and
    cancelling, at the first base station, an interference produced by the uplink transmission of the second terminal to the uplink transmission of the first terminal, based on the decoded uplink transmission of the second terminal.

18. A first base station configured for joint multi-user processing, the first base station being part of a telecommunication network that includes at least a second base station and first and second terminals served by the corresponding first and second base stations, the first base station comprising:
    a scheduling device configured to issue a first uplink transmission grant for the first terminal;
    an input device configured to receive from the second base station scheduling information about an uplink transmission of the second terminal, wherein an uplink transmission grant for the uplink transmission of the second terminal is issued by the second base station, wherein the input device receives the scheduling information after the scheduling device issues the first uplink transmission grant and prior the processor decodes the uplink transmission from the first terminal; and
    a processor connected to the scheduling device and the input device and configured to jointly decode an uplink transmission from the first terminal and the uplink transmission from the second terminal, which is not served by the first base station, based on the received scheduling information about the uplink transmission of the second terminal, wherein the processor is further configured to decode the uplink transmission from the first terminal, and cancel an interference produced by the uplink transmission of the second terminal to the uplink transmission of the first terminal, based on the decoded uplink transmission of the second terminal.

19. A first base station configured for joint multi-user processing, the first base station being part of a telecommunication network that includes at least a second base station and first and second terminals served by the corresponding first and second base stations, the first base station comprising:
    at least one processor configured to:

issuing a first uplink transmission grant for the first terminal;

receiving from the second base station scheduling information about an uplink transmission of the second terminal, wherein an uplink transmission grant for the uplink transmission of the second terminal is issued by the second base station, wherein the receiving step is performed after the issuing step and prior to the decoding, at the first base station, the uplink transmission from the first terminal; and jointly decoding an uplink transmission from the first terminal and the uplink transmission from the second terminal, which is not served by the first base station, based on the received scheduling information about the uplink transmission of the second terminal, wherein the joint multi-user processing step further comprises:

decoding, at the first base station, the uplink transmission from the first terminal; and cancelling, at the first base station, an interference produced by the uplink transmission of the second terminal to the uplink transmission of the first terminal, based on the decoded uplink transmission of the second terminal.

20. A non-transitory computer readable medium storing computer executable instructions, wherein the instructions, when executed by a processor of a first base station of a telecommunication network, which includes at least a second base station and first and second terminals served by the corresponding first and second base stations, cause the processor to jointly detect multi-users, the instructions comprising:

issuing, at the first base station, a first uplink transmission grant for the first terminal;

receiving, at the first base station, from the second base station scheduling information about an uplink transmission of the second terminal, wherein an uplink transmission grant for the uplink transmission of the second terminal is issued by the second base station, wherein the receiving step is performed after the issuing step and prior to the decoding, at the first base station, the uplink transmission from the first terminal; and jointly decoding, at the first base station, an uplink transmission from the first terminal and the uplink transmission from the second terminal, which is not served by the first base station, based on the received scheduling information about the uplink transmission of the second terminal, wherein the joint multi-user processing step further comprises:

decoding, at the first base station, the uplink transmission from the first terminal;
and cancelling, at the first base station, an interference produced by the uplink transmission of the second terminal to the uplink transmission of the first terminal, based on the decoded uplink transmission of the second terminal.

21. A method for joint multi-user processing in a first base station of a telecommunication network, which includes at least a second base station and first and second terminals served by the corresponding first and second base stations, the method comprising:

issuing, at the first base station, a first uplink transmission grant for the first terminal;

receiving, at the first base station, from the second base station scheduling information about an uplink transmission of the second terminal, wherein an uplink transmission grant for the uplink transmission of the second terminal is issued by the second base station, and wherein the receiving step is performed before the issuing step and prior to the decoding, at the first base station, the uplink transmission from the first terminal; and performing, at the first base station, joint multi-user decoding of the uplink transmission from the first terminal and the uplink transmission from the second terminal, which is not served by the first base station, based on the received scheduling information about the uplink transmission of the second terminal, wherein the joint multi-user processing step further comprises:

decoding, at the first base station, the uplink transmission from the first terminal;

decoding, at the first base station, the uplink transmission from the second terminal; and cancelling, at the first base station, an interference produced by the uplink transmission of the second terminal to the uplink transmission of the first terminal, based on the decoded uplink transmission of the second terminal.

22. A first base station configured for joint multi-user processing, the first base station being part of a telecommunication network that includes at least a second base station and first and second terminals served by the corresponding first and second base stations, the first base station comprising:

a scheduling device configured to issue a first uplink transmission grant for the first terminal;

an input device configured to receive from the second base station scheduling information about an uplink transmission of the second terminal, wherein an uplink transmission grant for the uplink transmission of the second terminal is issued by the second base station, wherein the input device receives the scheduling information before the scheduling device issues the first uplink transmission grant and prior the processor decodes the uplink transmission from the first terminal; and a processor connected to the scheduling device and the input device and configured to jointly decode an uplink transmission from the first terminal and the uplink transmission from the second terminal, which is not served by the first base station, based on the received scheduling information about the uplink transmission of the second terminal, wherein the processor is further configured to decode the uplink transmission from the first terminal, decode the uplink transmission from the second terminal, and cancel an interference produced by the uplink transmission of the second terminal to the uplink transmission of the first terminal, based on the decoded uplink transmission of the second terminal.

23. A first base station configured for joint multi-user processing, the first base station being part of a telecommunication network that includes at least a second base station and first and second terminals served by the corresponding first and second base stations, the first base station comprising:

at least one processor configured to:

issuing a first uplink transmission grant for the first terminal;

receiving from the second base station scheduling information about an uplink transmission of the second terminal, wherein an uplink transmission grant for the uplink transmission of the second terminal is issued by the second base station, wherein the receiving step is performed before the issuing step and prior to the decoding, at the first base station, the uplink transmission from the first terminal; and jointly decoding an uplink transmission from the first terminal and the uplink transmission from the second terminal, which is not served by the first base station, based on the received scheduling information about the uplink transmission of the second terminal, wherein the joint multi-user processing step further comprises:

decoding, at the first base station, the uplink transmission from the first terminal;

decoding, at the first base station, the uplink transmission from the second terminal; and cancelling, at the first base station, an interference produced by the uplink transmission of the second terminal to the uplink transmission of the first terminal, based on the decoded uplink transmission of the second terminal.

24. A non-transitory computer readable medium storing computer executable instructions, wherein the instructions, when executed by a processor of a first base station of a telecommunication network, which includes at least a second base station and first and second terminals served by the corresponding first and second base stations, cause the processor to jointly detect multi-users, the instructions comprising:

issuing, at the first base station, a first uplink transmission grant for the first terminal;

receiving, at the first base station, from the second base station scheduling information about an uplink transmission of the second terminal, wherein an uplink transmission grant for the uplink transmission of the second terminal is issued by the second base station, wherein the receiving step is performed before the issuing step and prior to the decoding, at the first base station, the uplink transmission from the first terminal; and jointly decoding, at the first base station, an uplink transmission from the first terminal and the uplink transmission from the second terminal, which is not served by the first base station, based on the received scheduling information about the uplink transmission of the second terminal, wherein the joint multi-user processing step further comprises:

decoding, at the first base station, the uplink transmission from the first terminal;

decoding, at the first base station, the uplink transmission from the second terminal; and cancelling, at the first base station, an interference produced by the uplink transmission of the second terminal to the uplink transmission of the first terminal, based on the decoded uplink transmission of the second terminal.

* * * * *

UNITED STATES PATENT AND TRADEMARK OFFICE
CERTIFICATE OF CORRECTION

PATENT NO. : 9,008,010 B2  
APPLICATION NO. : 12/992039  
DATED : April 14, 2015  
INVENTOR(S) : Frenger et al.

Page 1 of 1

It is certified that error appears in the above-identified patent and that said Letters Patent is hereby corrected as shown below:

ON THE TITLE PAGE

On Page 2, in Item (56), under "OTHER PUBLICATIONS", in Column 2, Line 10, delete "(E-UTRAN;" and insert -- (E-UTRAN); --, therefor.

IN THE SPECIFICATION

In Column 1, Line 25, delete "Access" and insert -- Access Network --, therefor.

In Column 2, Line 46, delete "measurments" and insert -- measurements, --, therefor.

In Column 6, Line 38, delete "eNBs. It" and insert -- eNBs, it --, therefor.

In Column 6, Line 63, delete "$UE_A$," and insert -- $UE_{A1}$ --, therefor.

In Column 9, Line 21, delete "it" and insert -- its --, therefor.

In Column 10, Line 16, in Equation (1), delete "RSRP_neighbor$\leq$" and insert -- RSRP_neighbor$\geq$ --, therefor.

In Column 12, Line 6, delete "eN $B_A$," and insert -- $eNB_A$, --, therefor.

Signed and Sealed this  
Twenty-third Day of February, 2016

Michelle K. Lee  
*Director of the United States Patent and Trademark Office*